United States Patent
Holman et al.

(10) Patent No.: US 10,963,235 B2
(45) Date of Patent: *Mar. 30, 2021

(54) PERSISTENT DATA STORAGE FOR A MICROSERVICES APPLICATION

(71) Applicant: Verizon Patent and Licensing Inc., Arlington, VA (US)

(72) Inventors: Candace Holman, Waltham, MA (US); Aniket Apte, Acton, MA (US); Kapil Jain, Bedford, NH (US); Manish Chugtu, Bedford, MA (US); Rehan Tahir, Bentleyville, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,907

(22) Filed: Jun. 12, 2019

(65) Prior Publication Data

US 2019/0294425 A1 Sep. 26, 2019

Related U.S. Application Data

(63) Continuation of application No. 15/462,142, filed on Mar. 17, 2017.

(51) Int. Cl.
| | |
|---|---|
| *G06F 8/60* | (2018.01) |
| *G06F 8/61* | (2018.01) |
| *G06F 9/50* | (2006.01) |

(52) U.S. Cl.
CPC ............... *G06F 8/61* (2013.01); *G06F 8/60* (2013.01); *G06F 9/5072* (2013.01)

(58) Field of Classification Search
CPC . G06F 8/61; G06F 8/60; G06F 9/5072; G06F 9/5011; G06F 9/5077
See application file for complete search history.

(56) References Cited

U.S. PATENT DOCUMENTS

| | | | |
|---|---|---|---|
| 9,274,710 B1 * | 3/2016 | Oikarinen | ............... G06F 3/067 |
| 9,294,558 B1 * | 3/2016 | Vincent | ............... H04L 67/1006 |
| 9,449,008 B1 * | 9/2016 | Oikarinen | ............. G06F 16/166 |
| 9,495,478 B2 * | 11/2016 | Hendrickson | ....... G06F 16/9024 |
| 9,519,510 B2 * | 12/2016 | Strauss | ................... G06F 9/467 |

(Continued)

OTHER PUBLICATIONS

REX-Ray, "REX-Ray Openly serious about storages," https://rexray.readthedocs.io/en/stable/, Dec. 2, 2016, 4 pages.

(Continued)

*Primary Examiner* — Matthew J Brophy

(57) ABSTRACT

A device can receive a specification identifying information associated with a stateful microservices application. The device can provide a request for storage information associated with the stateful microservices application based on the information included in the specification. The device can receive the storage information based on providing the request. The device can execute a storage installation procedure to provide the stateful microservices application with a storage volume based on receiving the storage information. The storage volume can be capable of providing persistent data storage. The device can provide a notification that the stateful microservices application is available for deployment on the device based on executing the storage installation procedure.

20 Claims, 10 Drawing Sheets

(56) References Cited

U.S. PATENT DOCUMENTS

| | | | |
|---|---|---|---|
| 9,569,459 B1* | 2/2017 | Strauss | G06F 16/182 |
| 9,602,424 B1* | 3/2017 | Vincent | H04L 67/1002 |
| 9,710,407 B2* | 7/2017 | Oikarinen | G06F 13/18 |
| 9,772,787 B2* | 9/2017 | Oikarinen | G06F 3/0643 |
| 9,779,015 B1* | 10/2017 | Oikarinen | G06F 16/10 |
| 9,852,137 B2* | 12/2017 | Mann | G06F 3/0647 |
| 10,146,642 B1* | 12/2018 | Bent | G06F 9/546 |
| 10,225,335 B2* | 3/2019 | Fu | H04L 67/10 |
| 10,228,964 B2* | 3/2019 | Caradonna | G06F 11/14 |
| 10,229,403 B2* | 3/2019 | Kawamori | G06Q 20/202 |
| 10,264,071 B2* | 4/2019 | Vincent | H04L 67/18 |
| 2011/0016272 A1* | 1/2011 | Jeong | G06F 3/0689 711/114 |
| 2013/0097275 A1* | 4/2013 | Wofford, IV | G06F 16/25 709/213 |
| 2013/0318309 A1* | 11/2013 | Jeong | G06F 3/0635 711/147 |
| 2014/0201312 A1* | 7/2014 | Jeong | G06F 3/0635 709/213 |
| 2015/0263983 A1* | 9/2015 | Brennan | H04L 41/12 709/226 |
| 2015/0277802 A1* | 10/2015 | Oikarinen | G06F 3/061 711/114 |
| 2015/0277969 A1* | 10/2015 | Strauss | G06F 9/466 707/703 |
| 2015/0278243 A1* | 10/2015 | Vincent | G06F 16/182 707/634 |
| 2015/0278397 A1* | 10/2015 | Hendrickson | G06F 16/9024 707/798 |
| 2015/0280959 A1* | 10/2015 | Vincent | H04L 67/1097 709/203 |
| 2016/0162693 A1* | 6/2016 | Breuer | G06F 21/602 713/164 |
| 2016/0179711 A1* | 6/2016 | Oikarinen | G06F 3/061 710/40 |
| 2016/0359955 A1* | 12/2016 | Gill | H04L 67/10 |
| 2016/0378518 A1* | 12/2016 | Antony | G06F 9/4856 718/1 |
| 2016/0379196 A1* | 12/2016 | Kawamori | G06Q 20/202 705/21 |
| 2017/0083541 A1* | 3/2017 | Mann | G06F 16/119 |
| 2017/0199770 A1* | 7/2017 | Peteva | G06F 9/5088 |
| 2017/0235649 A1* | 8/2017 | Shah | G06F 11/1469 707/649 |
| 2017/0257432 A1* | 9/2017 | Fu | H04L 67/2823 |
| 2017/0264684 A1* | 9/2017 | Spillane | G06F 16/178 |
| 2017/0344291 A1* | 11/2017 | Sterin | G06F 3/0632 |
| 2017/0364285 A1* | 12/2017 | Piduri | G06F 16/2365 |
| 2018/0129679 A1* | 5/2018 | Yao | G06F 16/1734 |
| 2018/0173554 A1* | 6/2018 | Caradonna | G06F 11/07 |
| 2018/0189121 A1* | 7/2018 | Jobi | G06F 9/5016 |
| 2018/0189176 A1* | 7/2018 | Jobi | G06F 9/5022 |

OTHER PUBLICATIONS

ClusterHQ, "What is Rocker?," https://clusterhq.com/flocker/introduction/, Jun. 17, 2015, 6 pages.

Flocker 1.0,Container Data Management for Docker-Cluster HQ, Jan. 5, 2016, pp. 1-5 (Year: 2016).

Ganesh,Sankar. "Scrutinize Into Prolific Environs with Energetic Data Management Using Flocker." International Journal of Engineering Technology and Computer Research 4.2 (2016). (Year: 2016).

Flocker Documentation 0.1.0 ClusterHQ (Year: 2014).

"Flocker 1.0: Container Data Management for Docker" ClusterHQ.com (Year: 2016).

Reich, Christoph, et al. "A SLA-oriented management of containers for hosting stateful web services." Third IEEE International Conference one-Science and Grid Computing (e-Science 2007). IEEE, 2007. (Year: 2007).

Wu, Yingjun, and Kian-Lee Tan. "ChronoStream: Elastic stateful stream computation in the cloud." 2015 IEEE 31st International Conference on Data Engineering. IEEE, 2015. (Year: 2015).

Pahl, Claus. "Containerization and the paas cloud." IEEE Cloud Computing 2.3 (2015): 24-31. (Year: 2015).

Nadgowda, Shripad, et al. "Voyager: Complete container state migration." 2017 IEEE 37th International Conference on Distributed Computing Systems (ICDCS). IEEE, 2017. (Year: 2017).

Pahl, Claus, et al. "A container-based edge cloud paas architecture based on raspberry pi clusters." 2016 IEEE 4th International Conference on Future Internet of Things and Cloud Workshops (FiCloudW). IEEE, 2016. (Year: 2016).

* cited by examiner

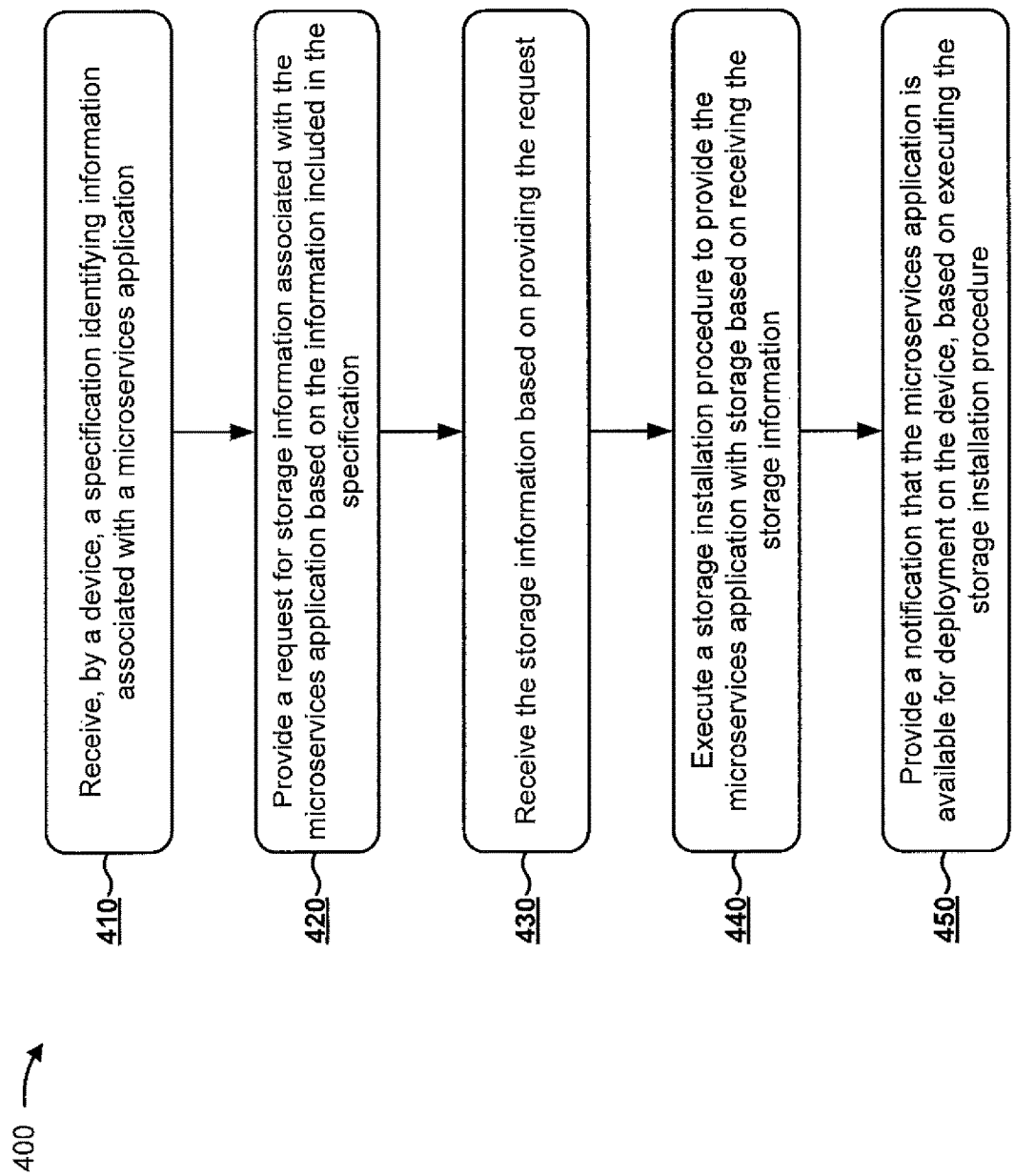

PERSISTENT DATA STORAGE FOR A MICROSERVICES APPLICATION

RELATED APPLICATION

This application is a continuation of U.S. patent application Ser. No. 15/462,142, filed Mar. 17, 2017, which is incorporated herein by reference.

BACKGROUND

A microservices architecture can refer to a software application that includes a suite of independently deployable and modular applications that each executes a unique process and interacts to achieve an overall functionality of the software application.

BRIEF DESCRIPTION OF THE DRAWINGS

FIG. 4 is a flow chart of an example process for utilizing storage volumes on a set of nodes that collectively host a microservices application to provide persistent location-independent data storage;

DETAILED DESCRIPTION OF PREFERRED EMBODIMENTS

The following detailed description of example implementations refers to the accompanying drawings. The same reference numbers in different drawings can identify the same or similar elements.

A microservices application can include an application that includes a set of applications (e.g., microservices) that each performs a particular functionality of the microservices application, and that each interacts to perform an overall functionality of the microservices application. Microservices, of the microservices application, can be independently scalable. That is, a first microservice can be associated with a first number of instances that are executing, a second microservice can be associated with a second number of instances that are executing, etc.

In some cases, a cloud platform can host a microservices application using one or more containers (e.g., one or more self-contained execution environments). For example, a cloud platform can use one or more containers to host a stateless microservices application (e.g., a microservices application that is stateless might not store data for subsequent use). As another example, a cloud platform can use one or more containers to host a stateful microservices application (e.g., a microservices application that is stateful might store data for subsequent use). However, hosting a stateful microservices application that provides persistent location-independent data storage can require manual provisioning of data storage, or can require duplicate containers that use additional storage resources.

Implementations described herein allow a microservices management platform to provide persistent, location-independent data storage for a microservices application by intelligently providing storage volumes to a set of computing nodes that host the microservices application. For example, the microservices management platform can attach and/or detach storage volumes from a set of computing nodes to provide storage for supporting a stateful microservices application. In this case, data can be provisioned at a particular location associated with a set of storage nodes (e.g., a hard disk drive (HDD)). Furthermore, the microservices management platform can modify the one or more microservices and/or the set of containers used to host the microservices without any indication to a user that the hosted microservices application has changed. In this way, the microservices management platform provides persistent data while conserving processing resources and/or network resources by efficiently distributing and redistributing storage volumes relative to using manual provisioning of data storage and/or duplicate containers to host a stateful microservices application that provides persistent location-independent data storage.

Figure 1A:
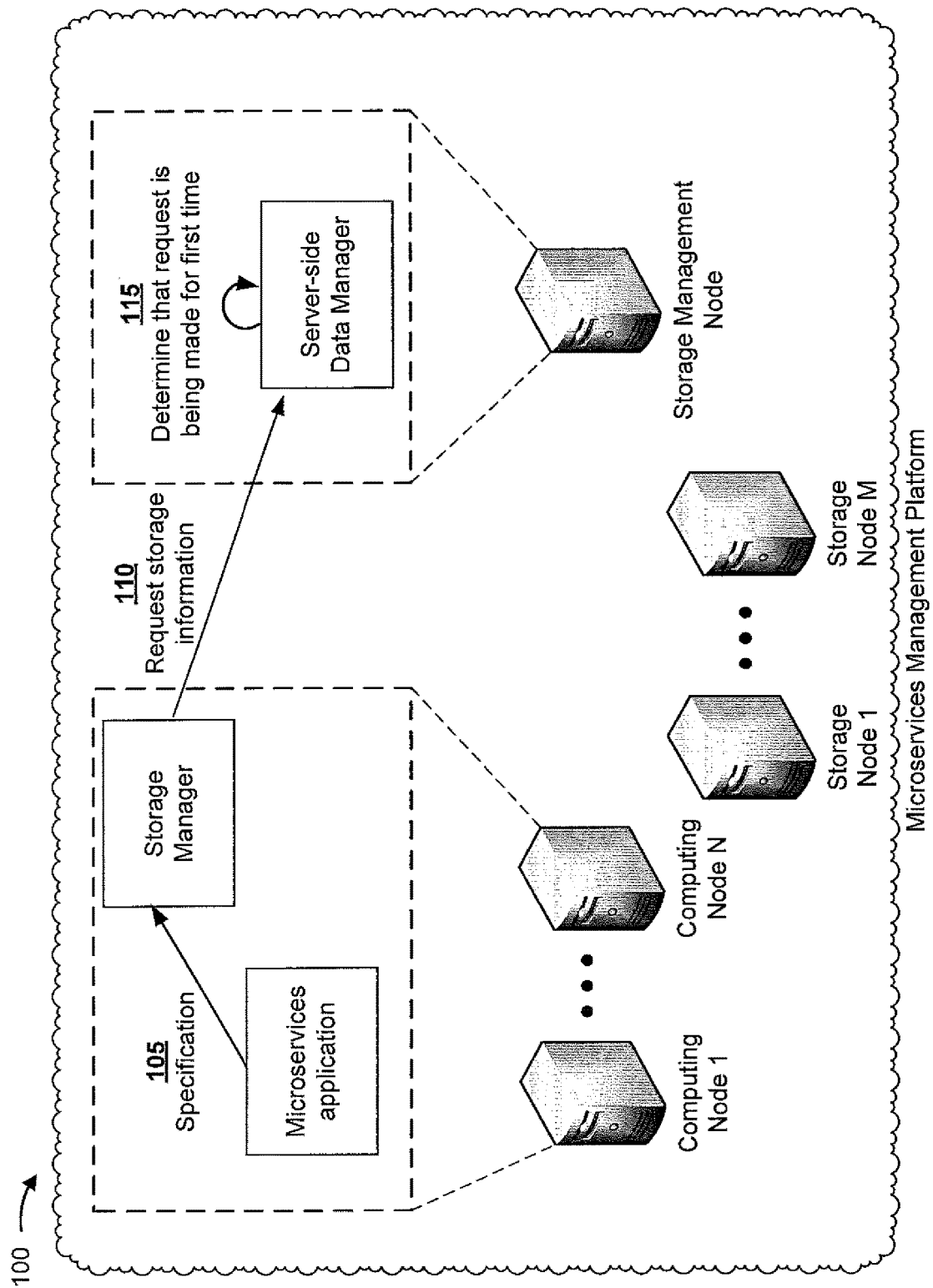
FIGS. 1A and 1B are diagrams of an overview of an example implementation described herein.
Figure 1B:
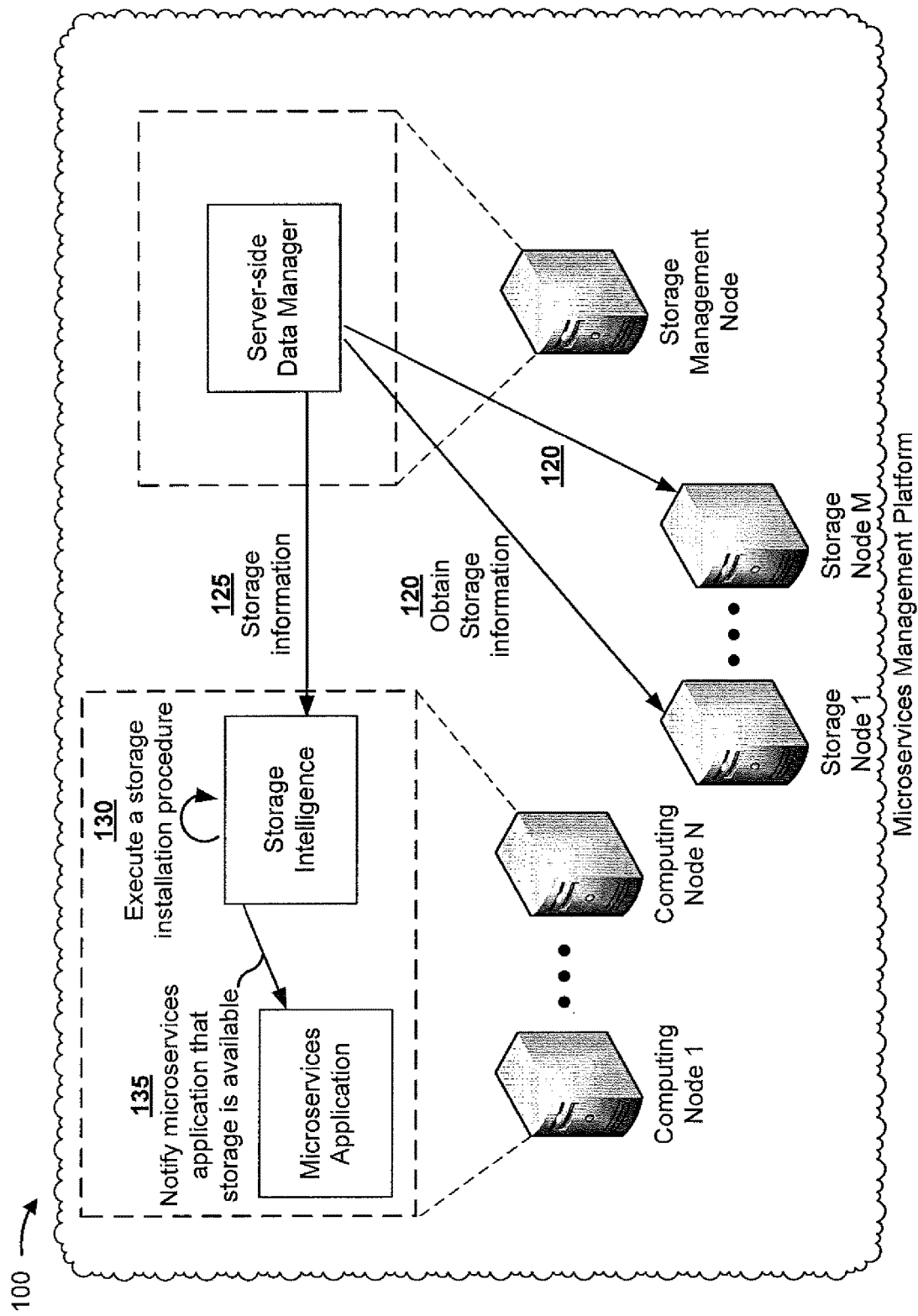

FIGS. 1A and 1B are diagrams of an overview of an example implementation 100 described herein. As shown in FIGS. 1A and 1B, example implementation 100 shows a microservices application hosted on a microservices management platform. As shown in FIGS. 1A and 1B, the microservices management platform can include a set of computing nodes (e.g., shown as computing node 1 to computing node N), a storage management node, and a set of storage nodes (e.g., shown as storage node 1 to storage node M). The set of computing nodes can be used to manage computing tasks associated with hosting the microservices application, and the storage management node can be used to manage the set of storage nodes that provide storage for the microservices application.

As shown in FIG. 1A, and by reference number 105, the microservices application can provide a specification to storage manager of the computing node. For example, an owner of the microservices application can provide (e.g., upload) the microservices application to the microservices management platform (e.g., by providing an image that includes a representation of the source code and/or the binaries associated with the microservices application), and the microservices application can provide the storage manager with a specification that includes information associated with the microservices application. The information included in the specification can include a microservices application identifier, a host internet protocol (IP) address, a value indicating a quantity of data for supporting the microservices application, a file path, information identifying a storage volume driver, a storage location within a container, and/or the like.

As shown by reference number 110, the storage manager can provide, to a server-side data manager of the storage management node, a request for storage information. For example, the storage manager can provide a request for storage information based on the information included in the specification. Storage information can include information used to attach and mount a storage volume (e.g., a shared directory to which data can be written to and/or read from), such as an IP address, a port identifier associated with a storage node that can be selected to provide data storage for the microservices application, metadata indicating a quantity of data available for storage, and/or the like.

As shown by reference number 115, the server-side data manager can determine that the request for the storage information is being made for the first time. For example, the server-side data manager can determine whether the request for the storage information is being made for the first time by comparing the microservices application identifier included in the specification to a data structure of microservices application identifiers. If the server-side data manager is unable to use the data structure to locate a corresponding microservices application identifier, the server-side data manager can determine that the request for storage information is being made for the first time (e.g., the microservices application was not ever hosted on another computing node). If the server-side data manager is able to use the data structure to locate a corresponding microservices application identifier, the server-side data manager can determine that the microservices application was not ever hosted by another computing node. In this case, the server-side data manager can detach the storage volume from the other computing node, and can attach the storage volume to the computing node from which the request is made, as described further herein.

As shown in FIG. 1B, and by reference number 120, the server-side data manager can obtain the storage information from the set of storage nodes. For example, the server-side data manager can communicate with the set of storage nodes to determine a particular location where storage is available, and can select the particular location to serve as the storage for the microservices application (e.g., the particular location might point to a hard disk drive (HDD) associated with a particular storage node). As shown by reference number 125, the storage manager can receive the storage information from the server-side data manager. For example, the storage manager can receive an IP address of the particular storage node, a port identifier associated with the particular storage node, metadata indicating a quantity of data available for storage, and/or the like.

As shown by reference number 130, the storage manager can execute a storage installation procedure. For example, the storage manager can execute a storage installation procedure to attach and mount the storage volume. By attaching and mounting the storage volume, the computing node that hosts the microservices application is able to complete configuration steps required by the microservices application (e.g., data can be written to the storage volume and/or read from the storage volume). As shown by reference number 135, the storage manager can notify the microservices application that storage is available, thereby allowing the microservices application to deploy on the computing node.

By executing the storage installation procedure to attach and mount the storage volume, the computing node that hosts the microservices application is able to deploy in a manner that provides persistent data storage, thereby improving scalability and availability of the microservices application relative to using local storage of the computing node and/or relative to using duplicate storage volumes which would waste resources.

As indicated above, FIGS. 1A and 1B are provided merely as an example. Other examples are possible and can differ from what was described with regard to FIGS. 1A and 1B.

Figure 2:
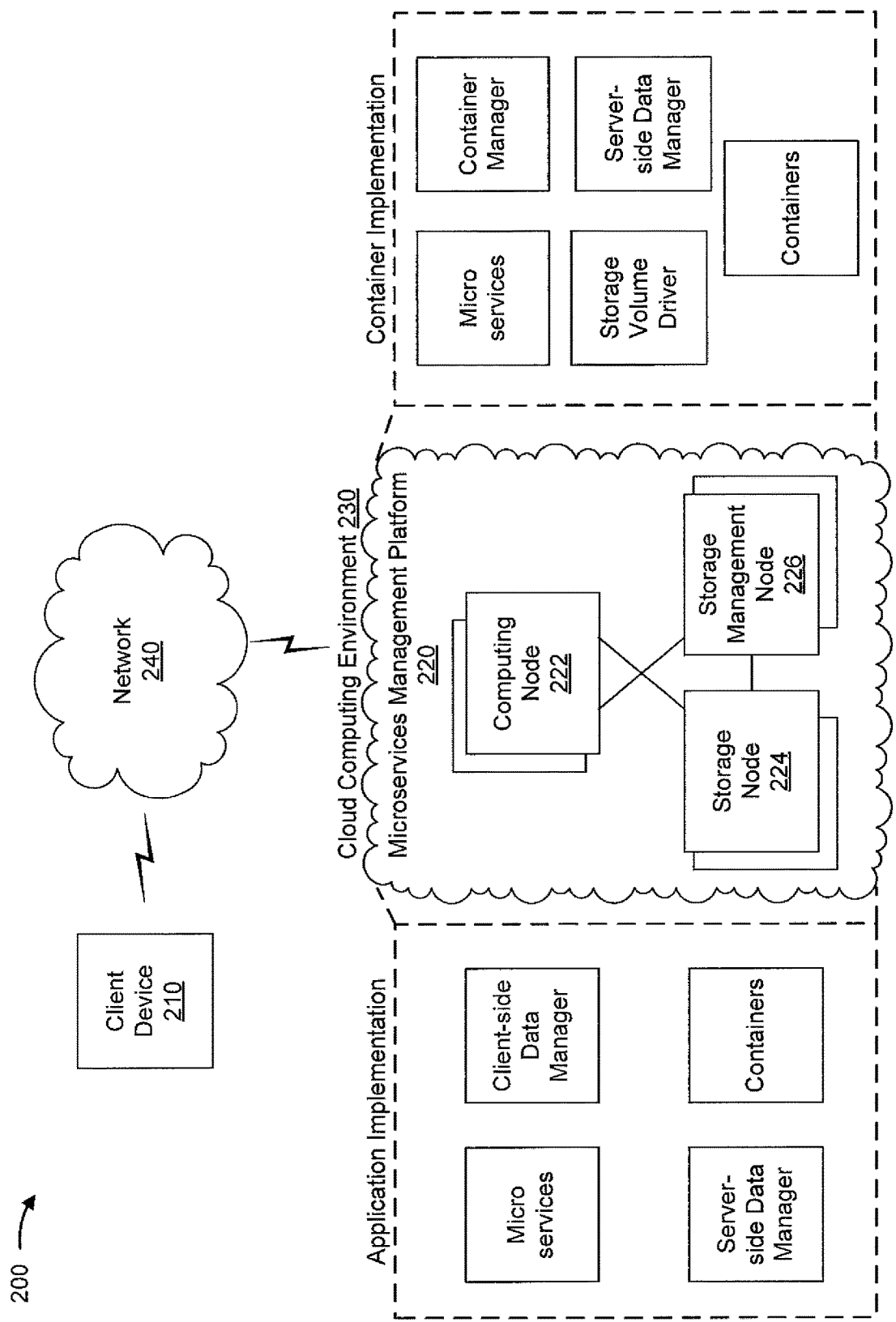
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include client device 210, microservices management platform 220 hosted within cloud computing environment 230, and network 240. Devices of environment 200 can interconnect via wired connections, wireless connections, or a combination of wired and wireless connections.

Client device 210 includes one or more devices capable of providing a microservices application to microservices management platform 220, receiving updates that the microservices application is ready for deployment, and/or accessing the microservices application after deployment. For example, client device 210 can include a computing device, such as a desktop computer, a laptop computer, a tablet computer, a handheld computer, a server device, a mobile phone (e.g., a smart phone or radiotelephone), or a similar type of device. In some implementations, client device 210 can communicate with microservices management platform 220 to provide the microservices application and/or an update to the microservices application. Additionally, or alternatively, client device 210 can receive updates, from microservices management platform 220 that the microservices application is ready for deployment. Additionally, or alternatively, client device 210 can access the deployed microservices application while the microservices application is being modified by microservices management platform 220.

Microservices management platform 220 includes one or more computing devices capable of deploying, configuring, generating, modifying, and/or providing microservices associated with a microservices application. In some implementations, microservices management platform 220 can be designed to be modular such that certain software components can be swapped in or out depending on a particular need. As such, microservices management platform 220 can be easily and/or quickly reconfigured for different uses. In some implementations, microservices management platform 220 can host a microservices application on a set of computing nodes 222 and/or a set of storage nodes 224 using one or more containers, and the one or more containers can be configured to process a microservice (or a task of a microservice), of the microservices application, in a particular way.

In some implementations, as shown, microservices management platform 220 can be hosted in cloud computing environment 230. Notably, while implementations described herein describe microservices management platform 220 as being hosted in cloud computing environment 230, in some implementations, microservices management platform 220 can be based outside of a cloud (i.e., can be implemented outside of a cloud computing environment) or can be partially cloud-based.

Cloud computing environment 230 includes an environment that hosts microservices management platform 220. Cloud computing environment 230 can provide computation, software, data access, storage, and/or other services that do not require end-user knowledge of a physical location and configuration of system(s) and/or device(s) that host microservices management platform 220. As shown, cloud computing environment 230 can include a group of nodes, such as computing nodes 222, storage nodes 224, and/or storage management node 226.

While implementations described herein can associate particular functionality with particular nodes, any one of the nodes associated with cloud computing environment 230 can perform any or all of the functionality described herein. Additionally, a single one of these nodes can, in some implementations, be implemented by multiple nodes. Further, a single one of these nodes can be implemented on a single computing device or can be implemented on multiple computing devices.

Computing node 222 includes one or more devices capable of using containers to host microservices. In some implementations, computing node 222 can include multiple computing nodes (referred to as a set of computing nodes 222). Additionally, or alternatively, computing node 222 can provide one or more tasks associated with microservices to another computing node 222 (e.g., via application programming interface (API) calls). In some implementations, computing node 222 can receive, from a microservices application, a specification for the microservices application. In some implementations, computing node 222 can implement a client-side data manager or a container manager to request and/or receive storage information, and to attach and mount a storage volume based on the storage information, as described further herein.

Storage node 224 includes one or more devices capable of providing data storage associated with a microservices application. In some implementations, storage node 224 can include multiple storage nodes (referred to as a set of storage nodes 224). Storage node 224 can include one or more storage systems and/or one or more devices that use virtualization techniques within the storage systems or devices of storage node 224. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations. In some implementations, storage node 224 can provide physical storage space for the microservices application (e.g., via one or more hard disk drives (HDDs), one or more solid state drives (SSDs), etc.), and data written to and/or read from the storage volume hosted by computing node 222 can be sent over the network to the physical storage space.

Storage management node 226 includes one or more devices capable of receiving, managing, modifying, attaching, detaching, and/or providing storage information or storage volumes. In some implementations, storage management node 226 can implement the server-side data manager to perform one or more operations associated with data storage. In some implementations, storage management node 226 can be a computing node 222.

As further shown in FIG. 2, computing node 222, storage node 224, and/or storage management node 226 can include a group of cloud resources associated with an application implementation and/or a container implementation, such as one or more microservices, a client-side data manager, a container manager, a storage volume driver, a server-side data manager, one or more containers, or the like.

Microservices include one or more instructions that can be provided to or accessed by client device 210. In some implementations, microservices can eliminate a need to install and execute the software applications on client device 210. For example, microservices can include software associated with microservices management platform 220 and/or any other software capable of being provided via cloud computing environment 230. In some implementations, a microservices application can be hosted by computing nodes 222 and/or storage nodes 224, using one or more containers.

Client-side data manager includes one or more instructions capable of receiving, requesting, managing, modifying, attaching, detaching, and/or providing storage information or a storage volume. In some implementations, the client-side data manager can receive a specification of a microservices application. In some implementations, client-side data manager can request and receive storage information from a server-side data manager associated with storage management node 226. Additionally, or alternatively, client-side data manager can execute a storage installation procedure to allow the microservices application to write to and/or read from the storage volume.

Container manager includes one or more instructions capable of allowing a microservices application and its dependencies to be packaged as a container. In some implementations, the container manager can receive a specification of a microservices application, and can provide the specification to the storage volume driver. Additionally, or alternatively, the container manager can receive storage information from the server-side data manager. Additionally, or alternatively, the container manager can execute a storage installation procedure to allow the microservices application to write to and/or read from the storage volume.

Storage volume driver includes one or more instructions that allow the storage volume driver to request storage information from the server-side data manager. In some implementations, all (or some) nodes used to host the microservices application can be provisioned with a storage volume driver. In some cases, the storage volume driver can be a plugin for the container manager. In other cases, the storage volume driver can be included in the operating system kernel.

Server-side data manager includes one or more instructions capable of receiving, managing, modifying, attaching, detaching, and/or providing storage information or storage volumes. In some implementations, server-side data manager can receive a request for storage information from the client-side data manager or the storage volume driver, and can use the information included in the request to obtain storage information from the set of storage nodes 224. In some implementations, server-side data manager can analyze the set of storage nodes 224 to determine whether a storage volume is available to support a microservices application. In some implementations, server-side data manager can provide a request to a first computing node 222 to detach a first storage volume, and can provide a location associated with the first storage volume to a second computing node 222, thereby allowing the second computing node 222 to attach to the first storage volume.

Containers include a self-contained execution environment that executes programs like a physical machine. In some implementations, containers can provide complete support for a microservices application, a microservice, a task of a microservice, or the like. Additionally, or alternatively, containers can share a kernel associated with a host operating system (e.g., the computing node 222 on which the container is deployed). In some cases, in addition to sharing the kernel of the host operating system, containers can share libraries and/or binaries associated with a microservices application, a microservice, a task of a microservice, or the like.

Network 240 includes one or more wired and/or wireless networks. For example, network 240 can include a cellular network (e.g., a fifth generation (5G) network, a fourth generation (4G) network, such as a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
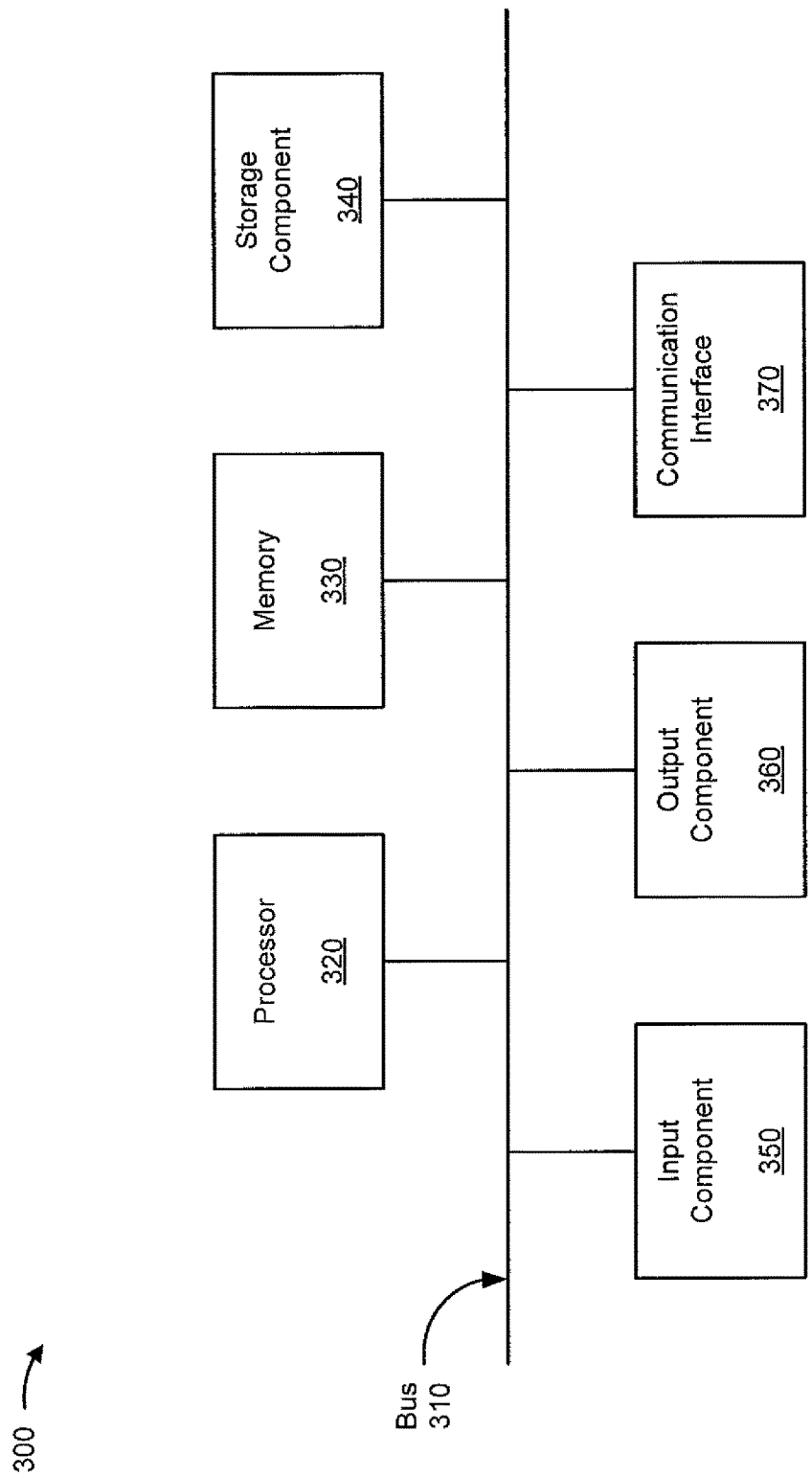
FIG. 3 is a diagram of example components of one or more devices of FIG. 2.

FIG. 3 is a diagram of example components of a device 300. Device 300 can correspond to client device 210 and/or microservices management platform 220. In some implementations, client device 210 and/or microservices management platform 220 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for utilizing storage volumes on a set of nodes that collectively host a microservices application to provide persistent location-independent data storage. In some implementations, one or more process blocks of FIG. 4 can be performed by computing node 222. In some implementations, one or more process blocks of FIG. 4 can be performed by another device or a group of devices separate from or including computing node 222, such as client device 210, storage node 224, and/or storage management node 226.

As shown in FIG. 4, process 400 can include receiving, by a device, a specification identifying information associated with a microservices application (block 410). For example, computing node 222 (e.g., a client-side data manager or a container manager) can receive, from the microservices application, a specification identifying information associated with the microservices application. In some implementations, a client-side data manager can analyze the specification and request storage information used to support the microservices application, as described further herein. In some implementations, a container manager can analyze the specification, and can interact with a storage driver to request storage information used to support the microservices application, as described further herein. In some implementations, the microservices application is a stateful microservices application.

In some implementations, client device 210 can provide (e.g., upload) a microservices application to microservices management platform 220, which can be sent to a set of computing nodes 222 and/or a set of storage nodes 224 that are selected to host the microservices application. For example, source code and/or binaries associated with the microservices application can be obtained from a global repository, and can be sent to the set of computing nodes 222 and/or the set of storage nodes 224.

In some implementations, computing node 222 (e.g., a client-side data manager) can receive a specification identifying information associated with a microservices application. For example, computing node 222 can host a microservices application that uses a plugin, and the client-side data manager hosted on computing node 222 can receive the specification from the microservices application via API calls enabled by the plugin. The specification can include information associated with the microservices application, such as a microservices application identifier, a host internet protocol (IP) address, a value indicating a quantity of data storage available for supporting the microservices application, a file path, and/or the like.

In some implementations, computing node 222 can host a microservices application as-is (e.g., without the microservices application using a plugin), and a container manager hosted on computing node 222 can receive the specification of the microservices application. The specification can include information associated with the microservices application, such as a microservices application identifier, information identifying a storage volume driver, a value indicating a quantity of data for supporting the application, a storage location within a container, and/or the like.

In this way, computing node 222 can receive a specification identifying information associated with a microservices application.

As further shown in FIG. 4, process 400 can include providing a request for storage information associated with the microservices application based on the information included in the specification (block 420). For example, computing node 222 (e.g., the client-side data manager or a storage volume driver associated with the container manager) can generate a request for storage information based on the information included in the specification and computing node 222 can provide the request to a server-side data manager hosted by storage management node 226. Storage information can include information associated with mounting a storage volume, such as an IP address and/or a port identifier associated with a storage node 224 that has been selected to provide data storage for the microservices application, metadata indicating a quantity of data available for storage, a storage networking protocol for managing data associated with the storage volume, and/or the like. A storage volume can provide storage for supporting the microservices application (e.g., or a microservice of the microservices application), and the microservices application can write data to the storage volume. For example, the storage volume can be a shared directory that is accessible by one or more containers that host the microservices application. In some cases, the storage volume can persist even if the one or more containers hosting the microservices application are removed.

In some implementations, computing node 222 (e.g., the client-side data manager) can request storage information from a server-side data manager. For example, computing node 222 can provide a request for storage information that includes information included in the specification, such as the host IP address, the quantity of data for supporting the microservices application, or the like, and the information included in the specification can be used by the server-side data manager when processing the request.

In some implementations, computing node 222 (e.g., the container manager) can provide the information included in the specification to the server-side data manager. For example, the container manager can provide the information included in the specification to the storage volume driver, which can cause the storage volume driver to communicate with the server-side data manager to request the storage information.

Additionally, the request for the storage information can cause storage management node 226 (e.g., the server-side data manager) to obtain the storage information from a set of storage nodes 224. For example, the server-side data manager can analyze the set of storage nodes 224 to determine whether storage is available, and if storage is available, the server-side data manager can select a storage node of the set of storage nodes to provide the storage. In this case, the server-side data manager can obtain storage information associated with the selected storage node, such as an IP address and/or a port identifier associated with the storage node, metadata indicating a quantity of data available for storage, or the like.

In some cases, the server-side data manager can analyze the set of storage nodes 224 with a scoring technique. For example, the server-side data manager can use a scoring technique to analyze each storage node 224, in the set of storage nodes 224, to determine a particular storage node 224 to select for supporting the data storage of the microservices application. In this case, the scoring technique can consider a set of factors, such as a load associated with a storage node 224, a total capacity of a storage node 224, an amount of available capacity of a storage node 224, a physical location of a storage node 224, one or more performance capabilities of a storage node 224, whether storage node 224 has enough data storage available to satisfy the request made in the specification, a time period in which storage node 224 has been active, one or more types of storage available on storage node 224 (e.g., HDD, SSD, etc.), an amount of available bandwidth of one or more links to storage node 224, and/or the like. In some cases, the set of factors can be weighted, allowing the server-side data manager to prioritize certain factors.

Additionally, the request for storage information can cause the server-side data manager to determine whether the microservices application is deployed to another computing node 222 or whether the microservices application is requesting to be deployed for the first time. For example, the server-side data manager can determine whether the microservices application is deployed because deployed microservices applications have microservices application identifiers stored in a data structure. In this case, the server-side data manager can compare the microservices application identifier to the data structure of microservices application identifiers.

In some cases, if the server-side data manager is unable to use the data structure to locate a corresponding microservices application identifier, the server-side data manager can determine that the request for storage information is being made for the first time. In this case, the server-side data manager can select a storage node 224 of the set of storage nodes 224 to provide storage for the microservices application, in the manner described above.

In other cases, if the server-side data manager is able to use the data structure locate a corresponding microservices application identifier, the server-side data manager can determine that that microservices application is deployed to another node. In this case, the server-side data manager can detach the storage volume from the other node, based on determining that the microservices application is deployed on the other node. Furthermore, computing node 222 can receive, from storage management node 226, an indication that the storage volume is detached from the other node.

Additionally, computing node 222 can provide, to storage management node 226, a request to attach the storage volume. The request to attach the storage volume can cause storage management node 226 to obtain the storage information, as described above.

By determining whether the microservices application is deployed to another node or is requesting to deploy for the first time, and by analyzing the set of storage nodes 224 to determine if storage is available, microservices management platform 220 efficiently and effectively utilizes network resources.

In this way, computing node 222 can provide a request for storage information, associated with the microservices application, based on the information included in the specification.

As further shown in FIG. 4, process 400 can include receiving the storage information based on providing the request (block 430). For example, the client-side data manager or the container manager of computing node 222 can receive the storage information from the server-side data manager of storage management node 226. In some cases, the client-side data manager can receive the storage information, which can trigger the client-side data manager to execute a storage installation procedure, as described further herein. In other cases, the container manager can receive the storage information, which can trigger the container manager to execute a storage installation procedure, as described further herein.

In this way, computing node 222 can receive the storage information based on providing the request.

As further shown in FIG. 4, process 400 can include executing a storage installation procedure to provide the microservices application with storage based on receiving the storage information (block 440). For example, computing node 222 (e.g., the client-side data manager, the container manager, etc.) can execute a storage installation procedure to allow the microservices application to access (e.g., write to, read from, etc.) a storage volume. The storage installation procedure can configure computing node 222 in a manner that allows computing node 222 to support traffic flow (e.g., data) from computing node 222 to a storage node 224 of a set of storages nodes 224. The storage installation procedure can use the storage information to attach a storage volume and to mount the storage volume. Attaching the storage volume can refer to a process in which a logical connection is created from the storage volume to a hypervisor hosting computing node 222 (e.g., using an internet small computer systems interface (iSCSI) protocol). Mounting the storage volume can refer to a process in which computing node 222 makes a file system available on computing node 222. In some cases, the mount process can instruct an operating system on how to logically map a file system structure to a physical storage device, such as an HDD of storage node 224. In some cases, the mount can generate a directory, accessible on computing node 222, and data associated with the microservices application can be written to the directory. In some cases, the storage volume can be capable of providing persistent data storage.

In some implementations, computing node 222 (e.g., the client-side data manager) can execute a storage installation procedure. For example, the client-side data manager can establish a path between computing node 222 and a storage node 224 that is hosting the storage volume. In this case, the path can allow traffic associated with the storage volume to be sent to a location within the storage node 224 that is hosting the storage volume (e.g., a particular HDD). Additionally, computing node 222 can mount the storage volume based on establishing the path.

In some implementations, computing node 222 (e.g., the container manager) can execute a storage installation procedure. For example, computing node 222 can attach the storage volume to computing node 222 using an IP address and/or a port identifier associated with a particular storage node 224, and computing node 222 can generate a file system on the storage volume based on the attachment. In this case, computing node 222 can mount the storage volume to an operating system of computing node 222 based on generating the file system. Additionally, computing node 222 can mount the storage volume to a container associated with computing node 222 based on mounting the storage volume to the operating system. In this way, computing node 222 is able to write data to and/or read data from the storage volume that is hosted by storage node 224, thereby providing persistent data storage.

In this way, computing node 222 may execute a storage installation procedure to provide the microservices application with storage based on receiving the storage information.

As further shown in FIG. 4, process 400 can include providing a notification that the microservices application is available for deployment on the device, based on executing the storage installation procedure (block 450). For example, computing node 222 (e.g., client-side data manager, container manager, etc.) can provide a notification that the microservices application is available for deployment, thereby allowing the microservices application to deploy on computing node 222.

In some implementations, such as after the microservices application deploys, computing node 222 (e.g., the client-side data manager, the container manager, etc.) can determine whether traffic associated with the storage volume satisfies a threshold, and computing node 222 can request and receive additional storage based on determining whether the traffic associated with the storage volume satisfies the threshold. For example, assume computing node 222 receives an indication that the microservices application has been deployed. Further assume computing node 222 receives traffic associated with client device 210 writing data to the storage volume. In this case, computing node 222 can determine that the traffic satisfies a threshold, which can cause computing node 222 to provide a request, to storage management node 226, for additional storage information. The request can trigger storage management node 226 to obtain the additional storage information from the set of storage nodes 224. In this way, computing node 222 is able to obtain the additional storage volume in the same manner (or in a similar manner) that was used to obtain the storage volume.

Additionally, computing node 222 can receive, from storage management node 226, the additional storage information and can execute another storage installation procedure to support the additional storage. For example, computing node 222 can receive, from storage management node 226, the additional storage information, which can cause computing node 222 to execute another storage installation procedure. In this case, computing node 222 can attach another storage volume, and can mount the other storage volume based on the attachment. By determining that the storage volume satisfies a threshold (e.g., reaches a particular capacity), and by obtaining an additional storage volume based on the determination, computing node 222 ensures persistent data storage.

In this way, computing node 222 can provide a notification that the microservices application is available for deployment based on executing the storage installation procedure.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, microservices management platform 220 provides persistent data while conserving processing resources and/or network resources by efficiently distributing and redistributing storage volumes.

Figure 5A:
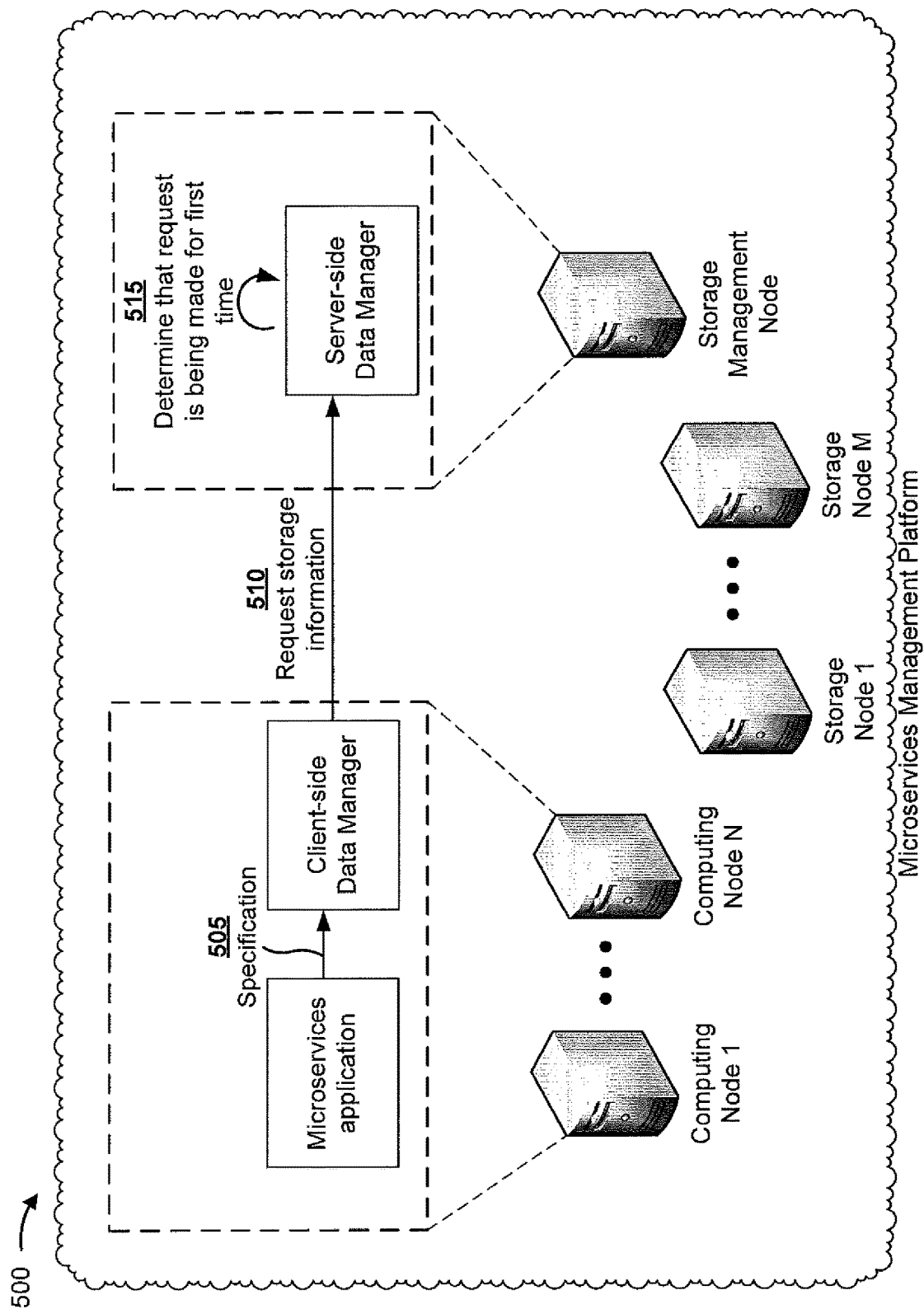
FIGS. 5A and 5B are diagrams of an example implementation relating to the example process shown in FIG. 4.
Figure 5B:
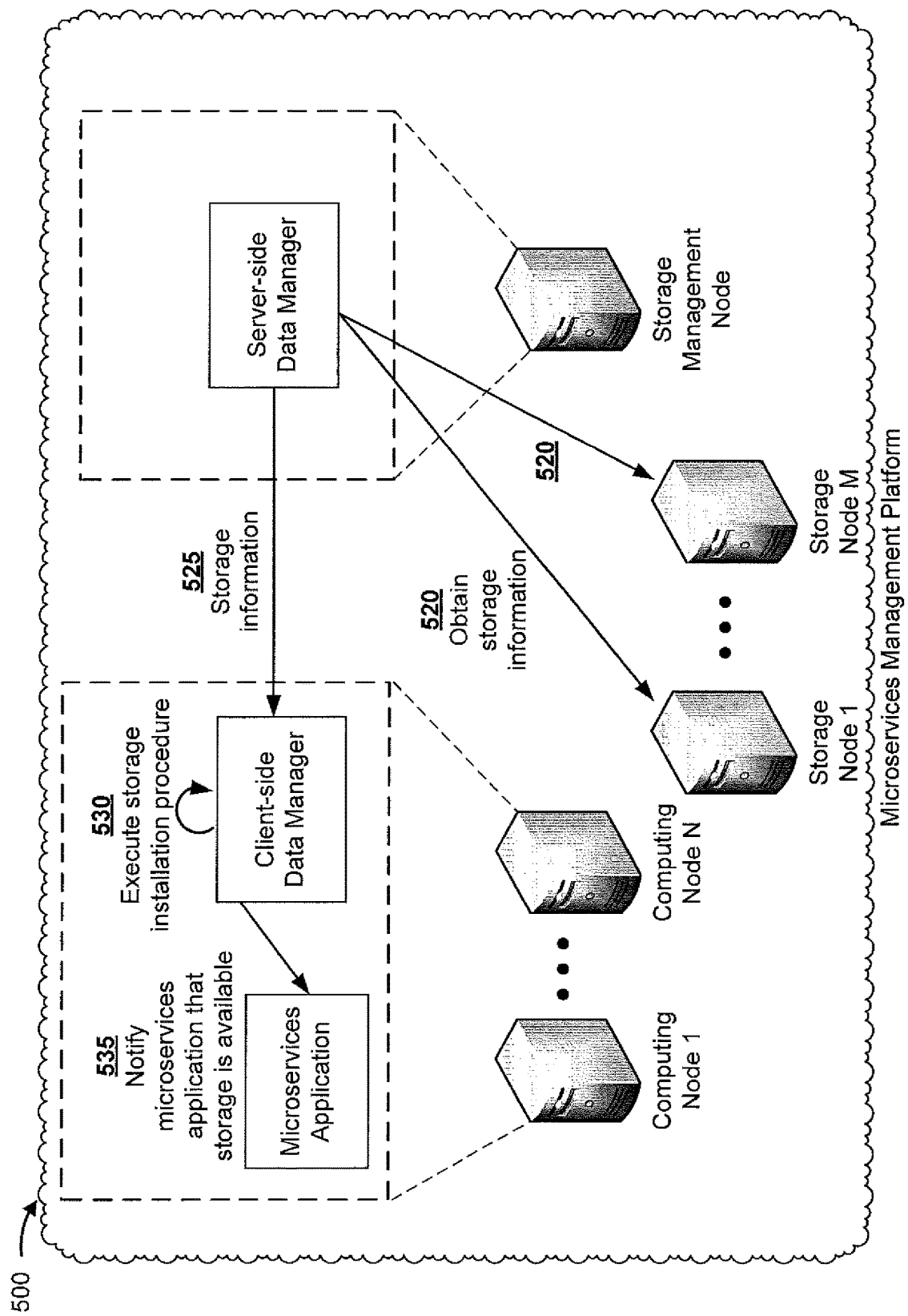

FIGS. 5A and 5B are diagrams of an example implementation 500 relating to example process 400 shown in FIG. 4. As shown in FIGS. 5A and 5B, example implementation 500 shows a stateful microservices application hosted on microservices management platform 220. As shown in FIGS. 5A and 5B, microservices management platform 220 can include a set of computing nodes 222 (e.g., shown as computing node 1 to computing node N), storage management node 226, and a set of storage nodes 224 (e.g., shown as storage node 1 to storage node M). In this case, the stateful microservices application can include a plugin to allow the microservices application to communicate with a client-side data manager.

As shown in FIG. 5A, and by reference number 505, the stateful microservices application can provide a specification to the client-side data manager. The specification can include information associated with the stateful microservices application, as described above. As shown by reference number 510, the client-side data manager can provide, to a server-side data manager, a request for storage information. For example, the client-side data manager can provide a request for storage information, where the request includes a microservices application identifier.

As shown by reference number 515, the server-side data manager can determine that the request for storage information is being made for the first time. For example, the server-side data manager can determine that the request for storage is being made for the first time by comparing the microservices application identifier included in the specification to a data structure of microservice application identifiers. In this case, assume the server-side data manager is unable to use the data structure to locate a corresponding microservices application identifier, which causes the server-side data manager to determine that the request for storage information is being made for the first time.

As shown in FIG. 5B, and by reference number 520, the server-side data manager can obtain the storage information from the set of storage nodes 224. For example, the server-side data manager can communicate with the set of storage nodes 224 to determine a particular location where storage is available (e.g., a HDD of a particular storage node 224), and can select the particular location as the location to serve as the storage for the stateful microservices application. As shown by reference number 525, the client-side data manager can receive the storage information from the server-side data manager. For example, the client-side data manager can receive an IP address of the particular storage node 224, a port identifier associated with the particular storage node 224, metadata indicating a quantity of data available for storage, and/or the like.

As shown by reference number 530, the client-side data manager can perform a storage installation procedure. For example, the client-side data manager can establish a path to the particular storage node 224 that is hosting the storage volume, based on the IP address and/or the port identifier associated with the particular storage node 224. In this case, the path can allow data written to the storage volume to be sent to a location within the particular storage node 224 (e.g., a HDD). Furthermore, the client-side data manager can mount the storage volume based on establishing the path. As shown by reference number 535, the client-side data manager can notify the stateful microservices application that storage is available.

By providing the microservices application with a plugin to communicate (e.g., via API calls) with the client-side data manager, and using the client-side data manager to obtain storage information that can be used to mount the storage volume, computing node 222 provides persistent data storage.

As indicated above, FIGS. 5A and 5B are provided merely as an example. Other examples are possible and can differ from what was described with regard to FIGS. 5A and 5B.

Figure 6A:
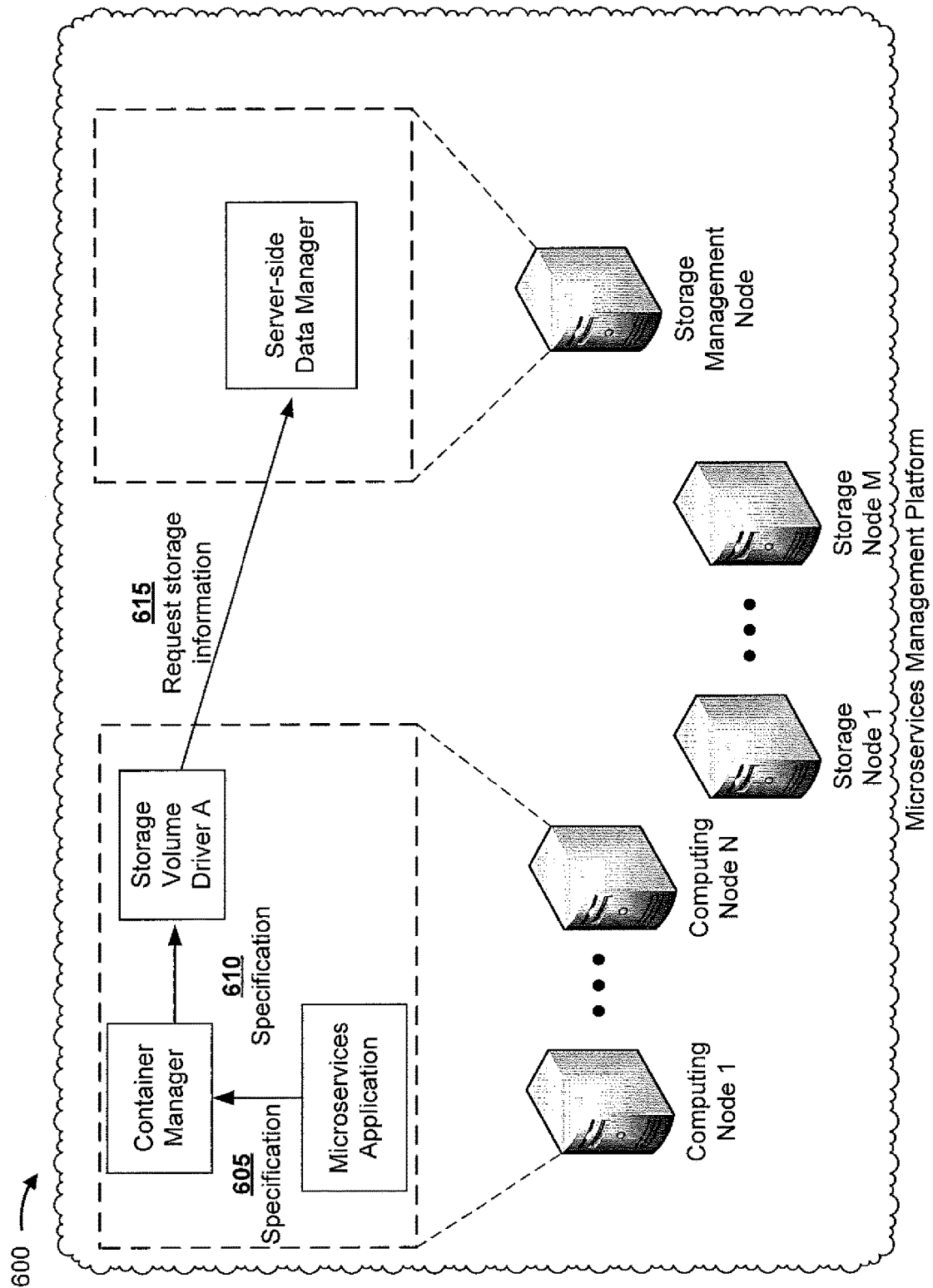
FIGS. 6A-6C are diagrams of an example implementation relating to the example process shown in FIG. 4.
Figure 6B:
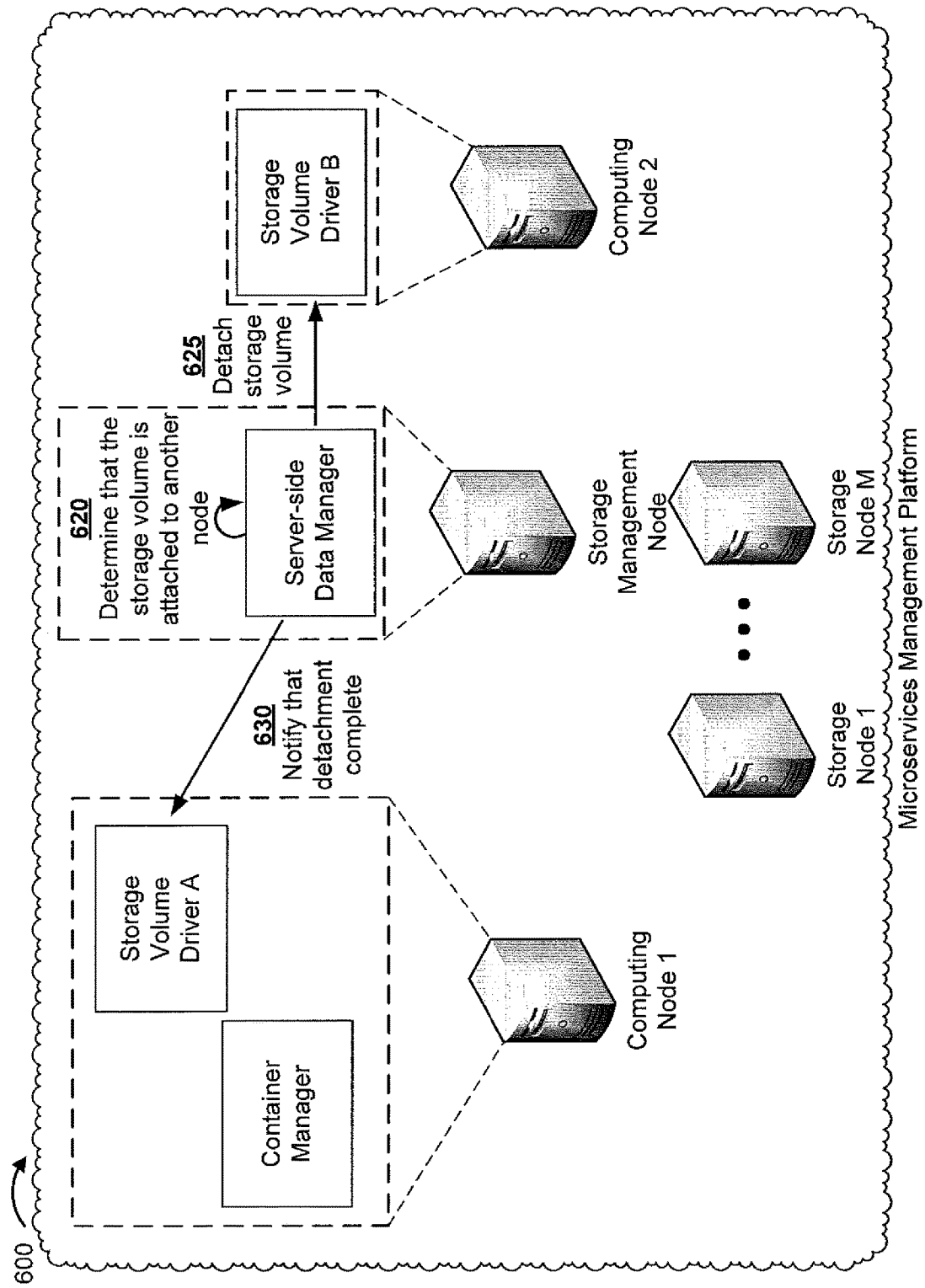
Figure 6C:
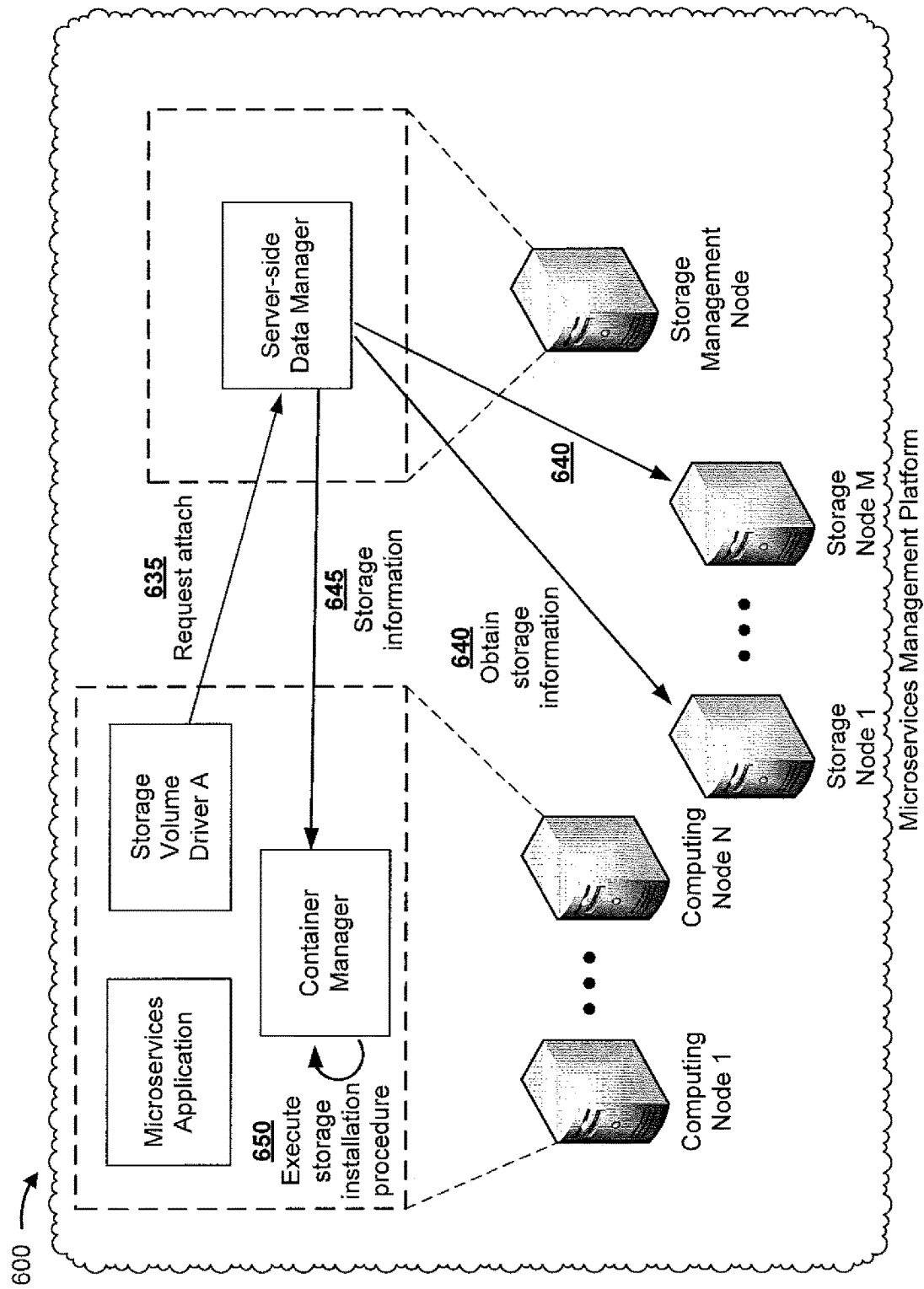

FIGS. 6A-6C are diagrams of an example implementation 600 relating to example process 400 shown in FIG. 4. As shown in FIGS. 6A-6C, example implementation 600 shows a stateful microservices application hosted on microservices management platform 220. As shown in FIGS. 6A-6C, microservices management platform 220 can include a set of computing nodes 222 (e.g., shown as computing node 1 to computing node N), storage management node 226, and a set of storage nodes 224 (e.g., shown as storage node 1 to storage node M). In this case, the stateful microservices application can be deployed as-is (e.g., without a plugin).

As shown in FIG. 6A, and by reference number 605, a container manager can receive a specification from the stateful microservices application. The specification can include information associated with the stateful microservices application, such as a microservices application identifier, information identifying a storage volume driver, a value indicating a quantity of data storage available for supporting the application, a storage location within a container, and/or the like. As shown by reference number 610, the container manager can use the information identifying the storage volume driver to provide the specification to storage volume driver A. As shown by reference number 615, storage volume driver A can provide a request for storage information to a server-side data manager. For example, storage volume driver A can provide a request for storage information that includes the microservices application identifier included in the specification.

As shown in FIG. 6B, and by reference number 620, the server-side data manager can determine that the storage volume is attached to another node. For example, the server-side data manager can compare the microservices application identifier to a data structure of microservices application identifiers. In this case, assume the server-side data manager is able to use the data structure to locate a corresponding microservices application identifier, which causes the server-side data manager to determine that the storage volume is attached to another node. In this case, the microservices application identifier can be stored in the data structure in a manner that associates the microservices application identifier with an IP address and/or a port identifier of a computing node 222 and/or a storage node 224 that is presently supporting the microservices application (e.g., shown as computing node 2). As shown by reference number 625, the server-side data manager can detach the storage volume from computing node 2. In this case, and as shown by reference number 630, storage volume driver A can receive a notification that the detachment is complete.

As shown in FIG. 6C, and by reference number 635, storage volume driver A can request an attachment. For example, storage volume driver A can request to attach to the storage volume that was previously attached to computing node 2. As shown by reference number 640, the server-side data manager can obtain storage information from the set of storage nodes 224. For example, the server-side data manager can communicate with the particular storage node 224 that was previously providing the storage volume to computing node 2, and can obtain the storage information associated with the storage volume. As shown by reference number 645, the container manager can receive the storage information from the server-side data manager.

As shown by reference number 650, the container manager can execute a storage installation procedure. For example, the container manager can attach the storage volume to the computing node 222 that is requesting to host the stateful microservices application (e.g., computing node 1) using the IP address and/or the port identifier associated with the particular storage node 224. In this case, the container manager can generate a file system on the storage volume based on the attachment. Additionally, the container manager can mount the storage volume to the operating system of the computing node 222 that is requesting to host the stateful microservices application, and can mount the storage volume to a container associated with the computing node 222. Furthermore, the container manager can notify the stateful microservices application that the attachment procedure has completed.

By utilizing the container manager to attach and mount the storage volume, computing node 222 provides containerized persistent data storage for a stateful microservices application. Additionally, the stateful microservices application can be hosted as-is (e.g., without use of a plugin), thereby providing persistent data without requiring any changes to the stateful microservices application.

As indicated above, FIGS. 6A-6C are provided merely as an example. Other examples are possible and can differ from what was described with regard to FIGS. 6A-6C.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device in a microservices management platform, comprising:
 a memory; and
 one or more processors to:
  generate, at a client manager or client-side data manager, a request for storage information, including a microservices application identifier associated with a stateful microservices application, based on information that is included in a specification and is associated with the stateful microservices application;
  provide the request based on the information included in the specification,
   the request to cause a server-side data manager to determine that the stateful microservices application is requesting the storage information for a first time based on a comparison of the microservices application identifier with a data structure comprising a plurality of microservices application identifiers,
   the storage information including information associated with a storage volume, and
   the server-side data manager obtaining the storage information from a storage node;
  execute a storage installation procedure to provide the stateful microservices application with the storage volume based on receiving the storage information; and provide a notification that the stateful microservices application is available for deployment on the device based on executing the storage installation procedure.

2. The device of claim 1, where the one or more processors are further to:
receive, from the server-side data manager, the storage information,
the storage volume including a shared directory that is accessible by one or more containers that host the stateful microservices application.

3. The device of claim 1, where the one or more processors, when receiving the specification, are to:
receive the specification from the stateful microservices application via an application programming interface enabled by a plugin.

4. The device of claim 1, where the one or more processors, when executing the storage installation procedure, are to:
configure the device to support traffic to flow from the device to the storage node.

5. The device of claim 1, where the one or more processors, when executing the storage installation procedure, are to:
attach the storage volume using the storage information, and
generate a file system based attaching the storage volume.

6. The device of claim 1, where the one or more processors are further to:
receive an indication that the stateful microservices application has been deployed;
receive traffic associated with a client device writing data to the storage volume;
determine that the traffic does not satisfy a threshold; and
receive additional storage based on determining that the traffic does not satisfy the threshold.

7. The device of claim 1, where the one or more processors are further to:
receive the specification identifying the information associated with the stateful microservices application.

8. A non-transitory computer-readable medium storing instructions, the instructions comprising:
one or more instructions that, when executed by one or more processors of a device in a microservices management platform, cause the one or more processors to:
generate, at a client manager or client-side data manager, a request for storage information, including a microservices application identifier associated with a stateful microservices application, based on information that is included in a specification and is associated with the stateful microservices application;
provide the request based on the information included in the specification,
the request to cause a server-side data manager to determine that the stateful microservices application is requesting the storage information for a first time based on a comparison of the microservices application identifier with a data structure comprising a plurality of microservices application identifiers,
the storage information including information associated with a storage volume, and
the server-side data manager obtaining the storage information from a storage node;
execute a storage installation procedure to provide the stateful microservices application with the storage volume based on receiving the storage information; and
provide a notification that the stateful microservices application is available for deployment on the device based on executing the storage installation procedure.

9. The non-transitory computer-readable medium of claim 8, where the one or more instructions, when executed by the one or more processors, further cause the one or more processors to:
receive, from the server-side data manager, the storage information,
the storage volume including a shared directory that is accessible by one or more containers that host the stateful microservices application.

10. The non-transitory computer-readable medium of claim 8, where the one or more instructions, that cause the one or more processors to receive the specification, cause the one or more processors to:
receive the specification from the stateful microservices application via an application programming interface enabled by a plugin.

11. The non-transitory computer-readable medium of claim 8, where the one or more instructions, that cause the one or more processors to execute the storage installation procedure, cause the one or more processors to:
configure the device to support traffic to flow from the device to the storage node.

12. The non-transitory computer-readable medium of claim 8, where the one or more instructions, that cause the one or more processors to execute the storage installation procedure, cause the one or more processors to:
attach the storage volume using the storage information, and
generate a file system based attaching the storage volume.

13. The non-transitory computer-readable medium of claim 8, where the one or more instructions, when executed by the one or more processors, further cause the one or more processors to:
receive an indication that the stateful microservices application has been deployed;
receive traffic associated with a client device writing data to the storage volume;
determine that the traffic does not satisfy a threshold; and
receive additional storage based on determining that the traffic does not satisfy the threshold.

14. The non-transitory computer-readable medium of claim 8, where the one or more instructions, when executed by the one or more processors, further cause the one or more processors to:
receive the specification identifying the information associated with the stateful microservices application.

15. A method comprising:
generating, at a client manager or client-side data manager on a device, a request for storage information, including a microservices application identifier associated with a stateful microservices application, based on information that is included in a specification and is associated with the stateful microservices application;
providing the request based on the information included in the specification,
the request to cause a server-side data manager to determine that the stateful microservices application is requesting the storage information for a first time based on a comparison of the microservices application identifier with a data structure comprising a plurality of microservices application identifiers,
the storage information including information associated with a storage volume, and
the server-side data manager obtaining the storage information from a storage node;
executing a storage installation procedure to provide the stateful microservices application with the storage volume based on receiving the storage information; and
providing a notification that the stateful microservices application is available for deployment on the device based on executing the storage installation procedure.

16. The method of claim 15, further comprising:
receiving, from the server-side data manager, the storage information,
the storage volume including a shared directory that is accessible by one or more containers that host the stateful microservices application.

17. The method of claim 15, where executing the storage installation procedure comprises:
configuring the device to support traffic to flow from the device to the storage node.

18. The method of claim 15, where executing the storage installation procedure comprises:
attaching the storage volume using the storage information, and
generating a file system based attaching the storage volume.

19. The method of claim 15, further comprising:
receiving an indication that the stateful microservices application has been deployed;
receiving traffic associated with a client device writing data to the storage volume;
determining that the traffic does not satisfy a threshold; and
receiving additional storage based on determining that the traffic does not satisfy the threshold.

20. The method of claim 15, further comprising:
receiving the specification identifying the information associated with the stateful microservices application.

* * * * *